US008254412B2

(12) United States Patent
Le Faucheur et al.

(10) Patent No.: US 8,254,412 B2
(45) Date of Patent: *Aug. 28, 2012

(54) IMPLEMENTING PRIORITY BASED DYNAMIC BANDWIDTH ADJUSTMENTS

(75) Inventors: Francois L. Le Faucheur, Valbonne (FR); Subhasri Dhesikan, San Jose, CA (US); James M. Polk, Colleyville, TX (US); Toerless T. Eckert, Mountain View, CA (US); Ashok Narayanan, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 12/693,307

(22) Filed: Jan. 25, 2010

(65) Prior Publication Data
US 2011/0182303 A1 Jul. 28, 2011

(51) Int. Cl.
H04J 3/16 (2006.01)
(52) U.S. Cl. ........................................ 370/468; 370/241
(58) Field of Classification Search .................. 370/468, 370/477, 229–237, 241, 242
See application file for complete search history.

(56) References Cited

U.S. PATENT DOCUMENTS

| | | | |
|---|---|---|---|
| 6,205,119 B1 | 3/2001 | Kacynski | 370/231 |
| 6,307,839 B1 | 10/2001 | Gerszberg et al. | 370/235 |
| 7,072,968 B2 | 7/2006 | Mikami et al. | 709/229 |
| 7,248,561 B2 | 7/2007 | Ishibashi et al. | 370/228 |
| 7,610,410 B2 * | 10/2009 | Uehara | 710/9 |
| 7,631,096 B1 | 12/2009 | Yeh et al. | 709/235 |
| 7,742,497 B2 * | 6/2010 | Ganti et al. | 370/448 |
| 2006/0187942 A1 * | 8/2006 | Mizutani et al. | 370/401 |
| 2008/0253394 A1 * | 10/2008 | Spinar et al. | 370/468 |
| 2011/0069609 A1 * | 3/2011 | Le Roux et al. | 370/221 |

FOREIGN PATENT DOCUMENTS
WO 2008/008886 1/2008

OTHER PUBLICATIONS

Polk, et al., "Integrated Services (IntServ) Extension to Allow Multiple TSPECs Draft-polk-tsvwg-intserv-multiple-tspec-01" Jul. 13, 2009 (27 pages).
Polk et al., "Technique for Reducing Resources Allocated to an Existing Reservation in a Data Network," U.S. Appl. No. 11/173,909, filed Jun. 30, 2005.

(Continued)

Primary Examiner — Gary Mui
(74) Attorney, Agent, or Firm — Baker Botts L.L.P.

(57) ABSTRACT

A method that includes receiving a reservation request from a first endpoint that comprises a bandwidth list identifying a plurality of bandwidth levels associated with the first endpoint. At least two of the bandwidth levels have a unique priority level associated therewith. The method also includes establishing a communication session between the first endpoint and at least one additional endpoint using a first bandwidth based on a first priority level. The first bandwidth and the first priority level are each associated with a first bandwidth level of the plurality of bandwidth levels. The method further includes detecting a bandwidth event that impacts a bandwidth used by the first endpoint for the communication session. The method additionally includes adjusting the bandwidth used by the first endpoint to a second bandwidth that is different than the first bandwidth based on a second priority level that is different than the first priority level.

20 Claims, 2 Drawing Sheets

OTHER PUBLICATIONS

Dhesikan, et al., "Executing and Supporting a Multiple Bandwidth Reservation Request," U.S. Appl. No. 12/262,498, filed Oct. 31, 2008.

Polk et al., Presentation "draft-polk-tsvwg-intserv-multiple-tspec-01" Jul. 13, 2009.

Le Faucheur et al., "Multiple Preemption Priority Policy Element for RSVP" Jul. 2009.

Polk et al., "A Resource Reservation Protocol (RSVP) Extension for the Reduction of Bandwidth of a Reservation Flow," Network Working Group, Request for Comments (RFC) 4495, http://tools.ietf.org/pdf/rfc4495.pdf, May 2006.

L. Bos et al., "A Framework for End-to-End User Perceived Quality of Service Negotiation," Nov. 2001.

S. Dhesikan, U.S. Appl. No. 12/262,498, filed Oct. 31, 2008, Office Action from the United States Patent and Trademark Office mailed Jan. 7, 2011.

* cited by examiner

IMPLEMENTING PRIORITY BASED DYNAMIC BANDWIDTH ADJUSTMENTS

TECHNICAL FIELD

The present disclosure relates generally to codecs and more particularly to implementing priority based dynamic bandwidth adjustments.

BACKGROUND

Many common audio and video codecs support multiple different quality levels and/or resolutions. Each level of quality and/or resolution associated with each codec may comprise a different bandwidth requirement. For example, for a particular codec an endpoint may support two levels of resolution (e.g., 1080p and 720p) and for each resolution it may support three different levels of quality (e.g., good, better, and best). The bandwidth requirements for such an endpoint may be as follows:

1080p at best quality may require 4 Mbps
    1080p at better quality may require 3.5 Mbps
    1080p at good quality may require 3 Mbps
    720p at best quality may require 2.5 Mbps
    720p at better quality may require 1.5 Mbps
    720p at good quality may require 1 Mbps One way to take advantage of the varying bandwidths is through the use of layered video coding. Endpoints that support layered video coding (e.g., H.264 scalable video coding (SVC)) may encode the video into a stand alone base layer that contains a base quality version of the stream and then may include multiple additional layers that each provide incremental quality enhancements over the previous layer.

BRIEF DESCRIPTION OF THE FIGURES

For a more complete understanding of particular embodiments and their advantages, reference is now made to the following description, taken in conjunction with the accompanying drawings, in which.

DESCRIPTION

Overview

The teachings of the present disclosure relate to a method that includes receiving a reservation request from a first endpoint. The reservation request may comprise a bandwidth list identifying a plurality of bandwidth levels associated with the first endpoint. At least two of the bandwidth levels may have a unique priority level associated therewith. The method also includes establishing a communication session between the first endpoint and at least one additional endpoint using a first bandwidth based on a first priority level. The first bandwidth and the first priority level are each associated with a first bandwidth level of the plurality of bandwidth levels. The method further includes detecting a bandwidth event that impacts a bandwidth available for use by the first endpoint for the communication session. The method additionally includes adjusting the bandwidth used by the first endpoint to a second bandwidth that is different than the first bandwidth based on a second priority level that is different than the first priority level. The second bandwidth and the second priority level are each associated with a second bandwidth level of the plurality of bandwidth levels.

Description of Example Embodiments

Figure 1:
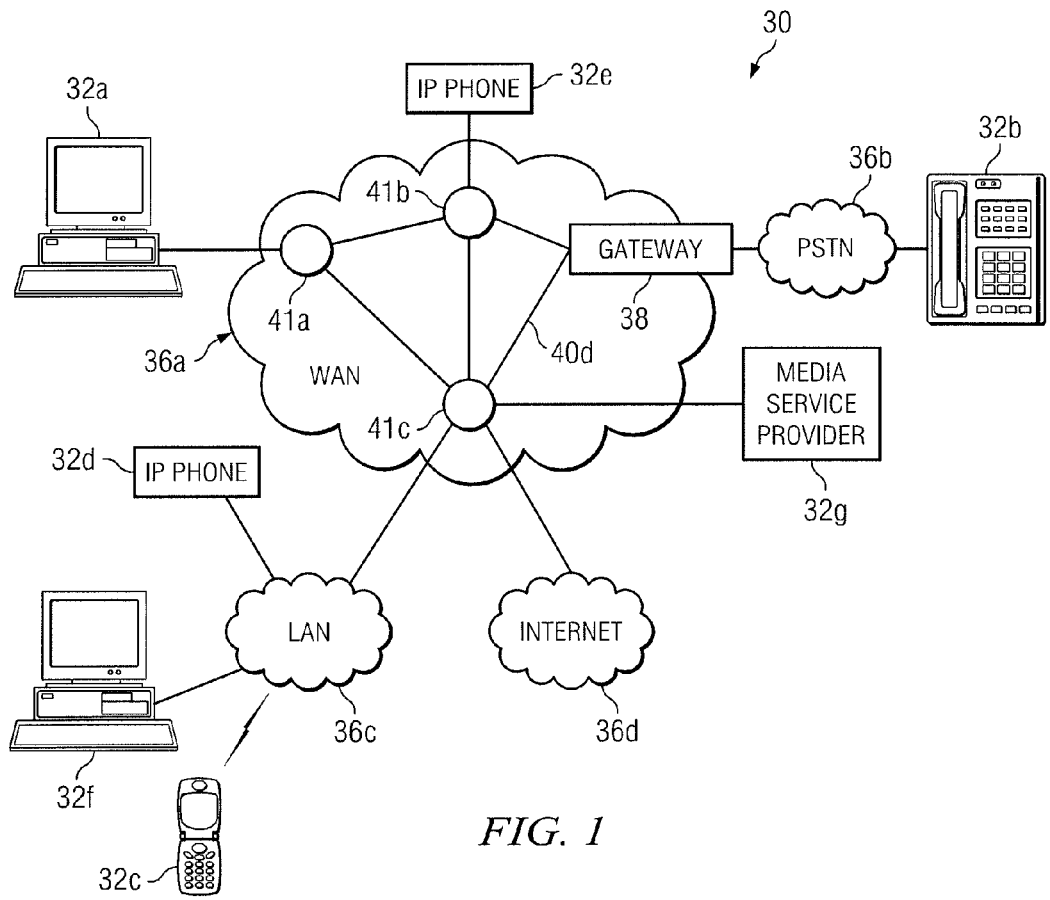
FIG. 1 illustrates a block diagram of a network configured to implement priority based dynamic bandwidth adjustments, in accordance with particular embodiments.

FIG. 1 illustrates a block diagram of a network configured to implement priority based dynamic bandwidth adjustments, in accordance with particular embodiments. Communication network 30 includes a plurality of endpoints 32a-32g having the ability to establish communication sessions between each other through one or more networks 36. Each of networks 36 may include one or more nodes through which a communication session may pass.

A communication session may include the sending or receiving of communications that comprise any type of media transmitted using any audio, video, and/or data means, including signals, data or messages transmitted through any suitable technology, such as voice devices, text chat, web sessions, streaming media (e.g., streaming video), downloadable media, real-time communications, facsimile, on-line gaming, instant messaging and e-mail. The media of a communication session may be routed through one or more nodes of one or more networks 36a-36d. Each node along the route may potentially present a bottleneck for the media of the communication session. These bottlenecks may exist as the communication session is being established, or they may arise while the communication session is in progresses (e.g., a bandwidth event may occur that reduces the amount available bandwidth at a particular node).

In order to avoid bottlenecks, both when establishing the communication session and as the communication session progresses, particular embodiments may use reservation requests (e.g., a Resource Reservation Protocol (RSVP) requests) that include bandwidth lists identifying, explicitly or implicitly, a plurality of supported bandwidth levels. Each bandwidth level may be determined based on one or more of a codec or algorithm, a quality level, and/or a resolution, supported by the endpoint 32 generating the reservation request. Associated with each bandwidth level may be a bitrate or bandwidth amount and/or a priority level. In certain embodiments, there may be priority levels associated with the different bandwidth levels in the bandwidth list in the reservation request. The bandwidth levels and priority levels may be used in determining the amount of resources that are reserved for a particular communication session as well as which communication session is preempted or reduced in response to a bandwidth event, as will be described in more detail below.

In the illustrated embodiment, communication network includes a mix of different types and sizes of networks 36. For example, network 36a is a wide area network (WAN) that enables signaling and communication sessions between a plurality of endpoints 32 and/or nodes 41. WAN 36a may be distributed across multiple cities and geographic regions, and may be referred to as a metro area network (MAN). Network 36b is a public switched telephone network (PSTN) and couples endpoint 32b with WAN 36a through gateway 38. Communication network 36c is a local area network (LAN) that couples endpoints 32c, 32d, and 32f with network 36a. Accordingly, users of endpoints 32a-32g, may establish communication sessions between and among each network component coupled for communication with one or more of networks 36a-36d.

Each of networks 36 include a plurality of nodes 41 that couple together endpoints 32, nodes 41, and other networks 36 (for simplicity, only nodes 41 of network 36a are depicted). This may allow for the establishment of a communication session between any of endpoints 32. In addition to establishing communication sessions, endpoints 32a-32g and nodes 41 may communicate control and data signals among each other.

Although the illustrated embodiment includes four networks 36a-36d, the term "network" should be interpreted as generally defining any interconnection of components capable of transmitting audio and/or video communication signals, data, and/or messages, including signals, data or messages transmitted through text chat, instant messaging and e-mail. Any one of networks 36a-36d may be implemented as a local area network (LAN), wide area network (WAN), global distributed network (e.g., the Internet), Intranet, Extranet, or any other form of wireless or wireline communication network. In addition, networks 36, in accordance with various embodiments, may include any number of endpoints 32 or nodes 41.

In addition to being coupled to other IP networks, network 36a may also be coupled to non-IP communication networks through the use of interfaces and/or components such as gateway 38. In the illustrated embodiment, network 36a is coupled to PSTN 36b through gateway 38. PSTN 36b may include switching stations, central offices, mobile telephone switching offices, pager switching offices, remote terminals, and other related communications equipment that are located throughout the world.

In particular embodiments, one or more of networks 36 may employ media communication protocols that allow for the addressing or identification of endpoints and/or, nodes coupled thereto. For example, using Internet protocol (IP), each of the components coupled together by network 36a may be identified in information directed using IP addresses. In this manner, network 36a may support any form and/or combination of point-to-point, multicast, unicast, or other techniques for exchanging media packets among components in communication network 30. In particular embodiments, one or more of networks 36 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility. Networks 36 may also use any other protocols (e.g., H.323) in transporting data. Any network components capable of exchanging audio, video, or other data using frames or packets are included within the scope of particular embodiments.

One or more of endpoints 32 and nodes 41 may support priority based dynamic bandwidth adjustments. As will be discussed in more detail below, certain embodiments may support priority based dynamic bandwidth adjustments through multiple bandwidth levels having varying priority levels associated therewith.

Depending on the embodiment, one or more of endpoints 32 and/or nodes 41 may include IP telephony or IP video conferencing capabilities allowing them to participate in and/or facilitate multimedia communication sessions. IP telephony or video conferencing devices may include telephones, videophones, fax machines, computers running telephony or video conferencing software, nodes, gateways, wired or wireless devices, hand held PDAs, video cameras, or any other device capable of performing telephony or video conferencing functions over an IP network.

In some embodiments, one or more of endpoints 32 may be a media service provider (MSP), such as MSP 32g. Depending on the situation, MSP 32g may include a media server that may itself function as an automated endpoint. For example, MSP 32g may include a media server that stores video files or voicemail messages for users of MSP 32g. In particular embodiments, MSP 32g may provide: (1) a VoIP service, (2) a video over IP service, (3) an on-line gaming service, (4) an IPTV (Internet Protocol based TV) service or (5) any other functionality typically provided by MSPs in communication systems.

Nodes 41 may include any combination of network components, session border controllers, gatekeepers, call managers, conference bridges, routers, hubs, switches, gateways, endpoints, edgepoints, or any other hardware, encoded software, or embedded logic implementing any number of communication protocols that allow for the exchange of packets in communication network 30. Network domains 36b-36d may comprise components similar to those of network 36a.

In particular embodiments, one or more of nodes 41, may be under the control of a computer system, security database, service provider, organization, entity or any other responsible component or entity. For example, a call management system may be responsible for establishing a communication session between endpoint 32a and media service provider 32g. The call management system may be off-path (e.g., the path for a communication session does not pass through the call management system) or on-path (e.g., the path for a communication session passes through the call management system). In particular embodiments, the call management system may provide or implement, in whole or in-part, the functionality, as disclosed herein, that provides the priority based dynamic bandwidth adjustments It will be recognized by those of ordinary skill in the art that endpoints 32 and nodes 41 may be any combination of hardware, encoded software, or embedded logic that provides communication services to a user. For example, endpoints 32a-32g may include a telephone, a computer running telephony or multi-media software, a media server, a video monitor, a camera, an IP phone, a cell phone or any other communication hardware, encoded software, or embedded logic running on a compute that supports the communication of packets of media (or frames) using networks 36. Endpoints 32a-32g may also include unattended or automated systems, gateways, other intermediate components or other devices that can establish communication sessions. Although FIG. 1 illustrates a particular number and configuration of endpoints, segments, nodes, and gateways, communication network 30 contemplates any number or arrangement of such components for communicating media. In addition, elements of communication network 30, such as MSP 36g, may include components centrally located (local) with respect to one another or distributed throughout communication network 30.

Figure 2:
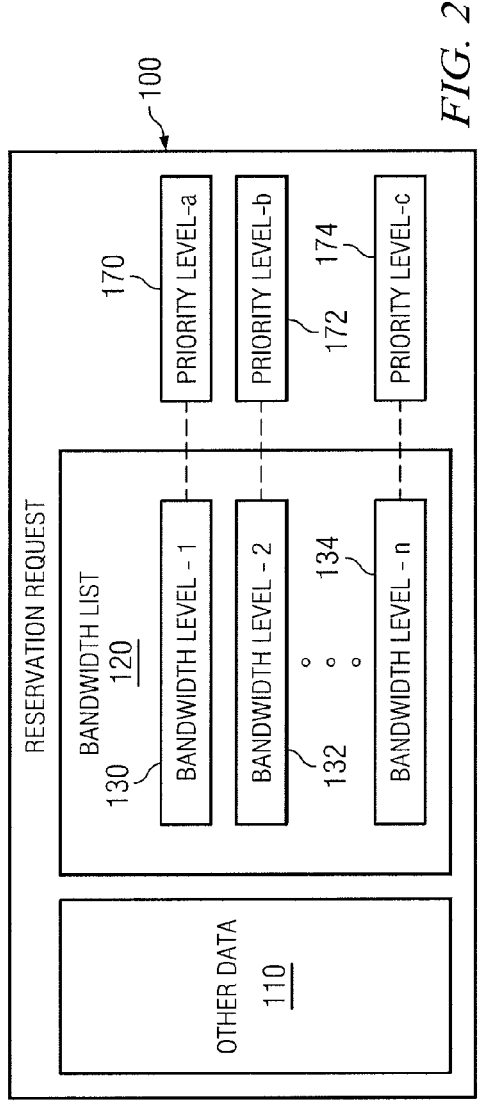
FIG. 2 illustrates a block diagram of a reservation request, in accordance with particular embodiments.

FIG. 2 illustrates a block diagram of a reservation request, in accordance with particular embodiments. The block diagram of FIG. 2 depicts certain relevant functional components of a reservation request used in some embodiments. Reservation request 100 includes bandwidth list 120, priority levels 170, 172, and 174 and other data 110. The contents of other data 110 are not specifically discussed herein. While each bandwidth level has a priority level associated therewith, in particular embodiments, one or more of the bandwidth levels may not have a priority level associated therewith. These bandwidth levels may have a default or routine priority level associated therewith. Thus, in some instances it may be the case that there are fewer priority levels than there are bandwidth levels.

Bandwidth list 120 provides a list of the various bandwidth levels 130, 132, and 134, and their respective priority levels 170, 172, and 174, supported by a particular endpoint for a particular communication session. These various bandwidth and priority levels may be stored by nodes along a path used for a communication session so that, as the node's bandwidth capacity changes, the node can increase or decrease the amount of bandwidth reserved for the communication session.

Each bandwidth level comprises one or more pieces of information from which the node may be able to reserve resources. For example, each bandwidth level may include one or more of the peak bit rate, burst bit rate, average bit rate, maximum packet size, or minimum packet size. The values of these parameters may be determined based on the codec, the resolution, and the quality associated with the respective bandwidth level. Bandwidth list 120 may include any number of bandwidth levels. Compared to traditional reservation systems, using and storing bandwidth lists 130 for future and on going communication sessions provides the nodes of a communication network with the ability to adjust the reserved bandwidth to match available bandwidth, even as bandwidth conditions change. This may help the network adapt to individual business needs.

The use of bandwidth levels 130, 132, and 134 and their associated priority levels 170, 172, and 174, as opposed to simply using layered video coding, allows a wide variety of endpoints to take advantage of priority based dynamic bandwidth adjustments. More specifically, such use may allow particular embodiments to be used with a relatively large variety of endpoints beyond those endpoints that support layered video coding (e.g., any endpoint that may support the use of more than one codec, quality level and/or resolution of video). Furthermore, associating different priority levels with the various bandwidth levels allows a node along a path of a communication session (or a requested communication session) to make educated preemption decisions (or resource reservations).

Furthermore, by using bandwidth levels 130, 132, and 134 to reserve resources, particular embodiments may improve upon the load placed on a communication network by not transmitting all the layers associated with layered video coding. More specifically, the use of bandwidth levels 130, 132, and 134 relieves the nodes of the task of having to either forward on all the layers or remove those higher bandwidth layers for which it does not have capacity to support. This benefit is magnified in situations in which there is a large difference between the highest and lowest supported bandwidths transmitted by the sender using layered video encoding.

By also including priority levels 170, 172, and 174 associated with each bandwidth level 130, 132, and 134, particular embodiments may allow nodes 241 and endpoints 232 to respond to changes in the availability of bandwidth along a particular path. The value of each priority level 170 may be indicative of a preemption priority value. The higher priority levels are given to bandwidth levels 130 requiring lower bandwidth 180. In some embodiments, the priority levels may increase as the amount of bandwidth decreases. Thus, the lower the amount of bandwidth required the higher the priority level. This may help to ensure that at a minimum the lowest bandwidth will have the highest priority, thereby providing the greatest probability that the respective communication session will be granted or not be completely terminated, as the case may be.

In addition to the relative amounts of bandwidth needed for a particular bandwidth level, the value of priority levels 170, 172, and 174 may take into account other factors such as the type of endpoint or communication session, the participants in the communication session, input from one of the participants, the application requesting the communication and/or any other factor that for which it may be desirable to increase or decrease the likelihood of reserving a particular amount of bandwidth.

One way in which an endpoint may signal its support for more than one bandwidth level 130 is through an RSVP request that includes multiple traffic specification fields (TSPEC) (as opposed to one TSPEC). More specifically, the relative information for each bandwidth level 130 may be placed in one of a plurality of TSPECs carried in an RSVP request (e.g., there may be a one-to-one correspondence between the number of bandwidth levels and the number of TSPECs). Another way in which an endpoint may signal its support for more than one bandwidth level 130 is through separate reservation requests. For example, a reservation request may be generated for each resolution supported by the endpoint. In this scenario, an endpoint supporting multiple resolutions would therefore need to send multiple reservation requests. Each reservation request may include one or more priority levels associated with one or more quality levels of the respective resolution. Regardless of the technique used, it may be desirable for at least one of the bandwidth levels to have its own explicit priority level (as opposed to an implicit priority level based on a default priority level value).

In some embodiments, rather than providing each supported bandwidth level, a subset of supported bandwidth levels may be provided. In these embodiments, bandwidth list 120 may include, at a minimum, two bandwidth levels—the first detailing the highest desired bandwidth with the lowest desired priority level and the second detailing the lowest desired bandwidth and the highest desired priority level. It would then be up to the nodes along the path to determine intermediate bandwidths and their associated priority levels. For example, the nodes may extrapolate different intermediate bandwidth and priority values between the values provided in bandwidth list 120. In some embodiments, the reservation request may include an explicit instruction for the node to determine intermediate bandwidths, and in some embodiments the nodes may assume that they are to determine intermediate bandwidths implicitly.

For example, assume an endpoint can support low, medium, high, and very high quality levels for a particular resolution that requires four, five, six, and seven Mbps, respectively. The endpoint may generate bandwidth list 130 with only two bandwidth levels. For example, bandwidth level 130 may indicate support for a high priority level at four Mbps and bandwidth level 134 may indicate support for a very low priority level at seven Mbps. When a node then receives reservation request 100, it may automatically extrapolate the other bandwidth and priority levels (or reservation request 100 may specifically instruct the node to extrapolate the other supported levels). Once the node has extrapolated the intermediate bandwidth levels, if the node subsequently determines that it cannot grant the seven Mbps of bandwidth at the very low priority level, it may go ahead and establish the reservation using any extrapolated values (e.g., 5 Mbps at medium priority or 6 Mbps at low priority).

Figure 3:
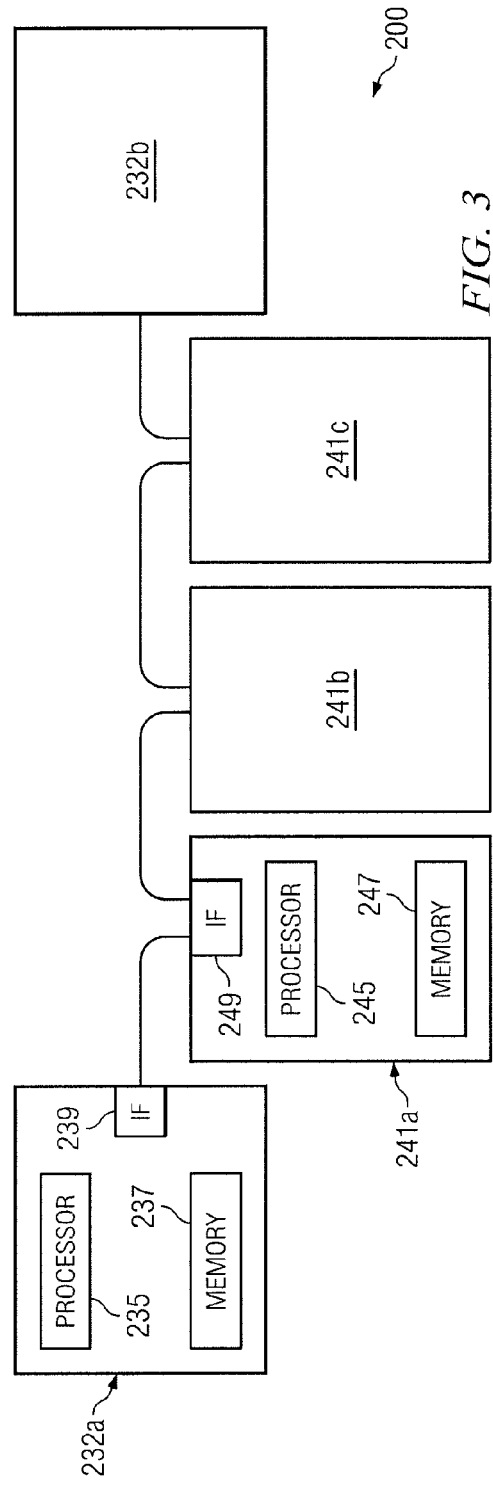
FIG. 3 illustrates a more detailed block diagram of an endpoint and a node of a network, in accordance with particular embodiments.

FIG. 3 illustrates a more detailed block diagram of an endpoint and a node of a network, in accordance with particular embodiments. More specifically, communication network 200 comprises two endpoints 232 participating in a communication session using a route that passes through three nodes 241. Endpoint 232a comprises processor 235 memory 237 and interface 239; similarly node 241a comprises processor 245, memory 247 and interface 249. For simplicity, the components of only one of endpoints 232 and one of nodes 241 are depicted. These components are described in more detail below.

Processor 235 may be a microprocessor, controller, application specific integrated circuit (ASIC), field-programmable gate array (FPGA), or any other suitable computing device, resource, or combination of hardware with encoded software or embedded logic operable to provide, either alone or in conjunction with other endpoint 232a components (e.g., memory 237 and/or interface 239) endpoint functionality. Such functionality may include establishing a communication session with one or more other endpoints 232.

One feature that certain embodiments may provide in establishing the communication session is the ability to implement priority based dynamic bandwidth adjustments. This may include processor 235 generating a reservation request (e.g., reservation request 100 depicted in FIG. 2) for a communication session that includes a bandwidth list identifying at least two supported bandwidth levels with at least one priority level being different than the default priority level associated with at least one of the bandwidth levels. The multiple bandwidths and their associated priority levels may allow nodes 241 to select the highest bandwidth that is available and supported by both the relevant node 241 and endpoint 232a. Furthermore, should the bandwidth availability at the relevant node 241 change in response to a bandwidth event while the communication session is in progress, the relevant node 241 may be able to use the multiple bandwidth and priority levels to determine whether, and by how much, endpoint 232a's communication session should be downgraded.

Memory 237 may be any form of volatile or non-volatile memory including, without limitation, magnetic media, optical media, random access memory (RAM), read-only memory (ROM), erasable programmable ROM (EPROM), electrically erasable programmable ROM (EEPROM), removable media, flash memory, or any other suitable local or remote memory component. Memory 237 may store any suitable data or information, including encoded software, or embedded logic, utilized by endpoint 232a and/or processor 235. For example, memory 237 may store a table, list, or other organization of data describing the codecs, resolutions, quality levels, and bandwidths supported by endpoint 232a. Memory 237 may also store one or more pieces of information that processor 235 may use in determining the appropriate priority level to associate with each of the bandwidth levels.

Interface 239 may comprise any hardware combined with any encoded software, or embedded logic needed to be able to send and receive information with other components of communication network 200. Interface 239 may, for example, transmit a reservation request generated by processor 235. Depending on the embodiment, interface 239 may provide any wired or wireless connection and support any wired or wireless protocol necessary to allow endpoint 232a to communicate with the other components of communication 200.

Processor 245 may be a microprocessor, controller, ASIC, FPGA, or any other suitable computing device, resource, or combination of hardware with encoded software or embedded logic operable to provide, either alone or in conjunction with other node 241a components (e.g., memory 247 and/or interface 249) node functionality. Such functionality may include reserving resources for a communication session between two or more endpoints 232.

One feature that certain embodiments may provide in reserving the resources for the communication session is the ability to implement priority based dynamic bandwidth adjustments. This may include storing the bandwidth list and the priority levels received in an endpoint's reservation request (e.g., reservation request 100 depicted in FIG. 2). The multiple bandwidth and priority levels provided in the reservation request may allow processor 245 to select the highest bandwidth that is available and supported (e.g., for which the priority level is sufficiently high) by both node 241a and endpoint 232a. Furthermore, should node 241a detect a bandwidth event reducing the amount of available bandwidth while the communication session is in progress, node 241a may be able to use the various bandwidth levels and their associated priority levels for one or more communication sessions stored in, for example, memory 247 to determine whether, and by how much, endpoint 232a's communication session should be downgraded.

Memory 247 may be any form of volatile or non-volatile memory including, without limitation, magnetic media, optical media, RAM, ROM, EPROM, EEPROM, removable media, flash memory, or any other suitable local or remote memory component. Memory 247 may store any suitable data or information, including encoded software or embedded logic utilized by node 241a and/or processor 245. For example, memory 247 may store a table, list, or other organization of data describing, for each endpoint participating in a communication session through node 241a, the bandwidth lists and any associated priority information for the respective endpoints. Memory 247 may also store one or more pieces of information that processor 245 may use to track communication sessions currently in progress. In some embodiments, memory 247 may also contain one or more policies that processor 245 may use in determining which communication session or sessions to downgrade and how to down grade the selected communication session.

Interface 249 may comprise any hardware combined with any encoded software or embedded logic needed to be able to send and receive information with other components of communication network 200. For example, interface 249 may receive and retransmit the reservation request generated by, for example, endpoint 232a. Depending on the embodiment, interface 249 may provide any wired or wireless connection and support any wired or wireless protocol necessary to allow node 241a to communicate with the other components of communication network 200.

It is often desirable for an endpoint to receive the greatest amount of bandwidth that it can support for a particular communication session. Unfortunately, not every hop along the path used by the communication session will always be able to support the full bandwidth supported by the requesting endpoint. Using the resource reservation protocol RSVP (e.g., Request for Comments (RFCs) 2205 and 2210) there are known techniques by which an endpoint may attempt to establish a smaller reservation if a larger reservation cannot be established. For example, upon a first RSVP message being sent and rejected, a second RSVP message, requesting less bandwidth than in the first RSVP message, may be sent. However, these RFCs require multiple round trip time delays before the reservation can be established at the best achievable resolutions These RFCs also do not provide for dynamic adjustments to the bandwidth to respond to various bandwidth events that may occur during the communication session.

RFC 3181, an extension to RFC 2205, discloses a reservation system that includes prioritization and preemption capabilities for a single bandwidth and describes how to encode an RSVP message to include reservation priority information (e.g., within the PREEMPTION_PRI object of an RSVP message). However, this RFC provides no mechanism by which the actual bandwidth allocated for a session is adjusted during the session. Thus, in the case of constriction at a particular node, RFC 3181 does not provide a way for the highest resolution layers across multiple different sessions to protect the base resolution of other sessions.

The following example may help to illustrate certain features and benefits of particular embodiments. In this example, it may be assumed that endpoint 232a wishes to establish a communication session with endpoint 232b. The communication session may comprise a two-way exchange of media (e.g., a video over IP call) or a one-way exchange of media (e.g., streaming video from one endpoint to the other). Regardless of the type of communication session, endpoint 232a may first need to generate and transmit a reservation request so that any nodes 241 along the path from endpoint 232a to endpoint 232b may reserve bandwidth to be used for the requested communication session.

In particular embodiments, once a user has indicated a desire to commence a communication session with, for example, endpoint 232b, processor 235 may search memory 237 to determine what resolutions, codecs, and quality levels are available so processor 235 may determine what bandwidths and priority levels are to be included in a reservation request. In some embodiments, all this information may be pre-stored in memory 237. The reservation request may, for example, comprise an RSVP message that may not only communicate the ideal, highest supported bandwidth level and associated priority level, but also may provide information that may be used in case a new reservation cannot be established at the ideal bandwidth level. This information may allow any nodes 241 along the path of the communication session to establish the reservation at the highest bandwidth available that the respective node 241 can support, based on the various priority levels, without having to engage in any additional signaling exchanges with endpoint 232a. This may avoid delays associated with establishing a communication session in a traditional system in which trial and error is used to repeatedly decrease the requested bandwidth until a reservation is successfully established.

Assume, for purposes of this example, that processor 235 determines that the requested communication session is to use a single codec at a single resolution having three difference quality levels. The processor may then determine that three bandwidth levels are needed, one for each of the three quality levels. For this example, the three quality levels are low, medium and high. Processor 235 may further determine that the three quality levels result in three different bandwidths. The three bandwidths for this example are one, two, and three Mbps of bandwidth, respectively. Based on this information, and one or more priority policies stored in memory 237, processor 235 may assign three different priority levels, one for each of the three bandwidth levels. The three priority levels for this example, in order of their respective priority, are three, two, and one, respectively (e.g., the low quality level has the highest relative priority level of the three indicating it is the least likely to be preempted).

Based on theses determinations, processor 235 and interface 239 may work together to generate and transmit a single reservation request with the following bandwidth list:

Bandwidth level-1: Assign a priority level of ONE for an advanced video coding (AVC) encoded communication session at 720p with a high quality level using THREE Mbps;

Bandwidth level-2: Assign a priority level of TWO for an AVC encoded communication session at 720p with a medium quality level using TWO Mbps; and Bandwidth level-3: Assign a priority level of THREE for an AVC encoded communication session at 720p with a low quality level using ONE Mbps.

This reservation request may be sent to endpoint 232b, via one or more of nodes 241. Each node along the path from endpoint 232a to endpoint 232b may then reserve resources for the requested communication session based, in part, on the bandwidth list and the node's own resource availability, as discussed in more detail below.

In establishing the communication session, each node 241 along the route between endpoints 232 may receive, via interface 249, the reservation request with its bandwidth list and priority levels. If, for example, processor 245 of node 241a determines that based on the relevant priority levels node 241a is unable to support a particular bandwidth level in the bandwidth list it may remove that bandwidth level (and the associated priority level) from the bandwidth list before interface 249 relays the reservation request downstream to the next node in the path (e.g., node 241b). Changing the reservation request sent to the downstream nodes may reduce the likelihood of subsequent nodes attempting to establish a communication session using the higher, unsupported bandwidth. Node 241a may also communicate via interface 249 its inability to support the relevant bandwidth level to any previous nodes (e.g., upstream) that may have already reserved the bandwidth which node 241a is unable to support. The inability of node 241a to support the highest bandwidth level will eventually be made known to endpoint 232a. This may allow upstream components to adjust accordingly.

Now, assume that the communication session has begun, that is node 241a has made the reservation and the reservation request successfully made it to endpoint 232b. Further assume that node 241a is currently supporting ten communication sessions that are each based on reservation requests similar to the reservation request sent by endpoint 232a discussed above. Also assume that node 241a only has thirty Mbps of bandwidth available for the ten communication session and is thus currently at its capacity (e.g., ten communication sessions*three Mbps per communication session=thirty Mbps).

Based on the above assumptions, it can be seen that if node 241a were to receive a reservation request for an eleventh communication session, processor 245 would determine that node 241a is already at capacity. Accordingly, processor 245 may then look to see if it can downgrade any of the current communication sessions to provide the bandwidth needed to establish the eleventh communication session.

In looking for a communication session to downgrade, processor 245 may determine if there are any current communication sessions that have a priority level lower than at least one of the priority levels in the incoming reservation request. In some embodiments, upon identifying one or more communication sessions having a lower priority than the requested priority, processor 245 may also confirm that the priority of the identified communication session is not the lowest priority level associated with their respective communication sessions (e.g., that there is at least one lower priority level available to which downgrade). For simplicity, assume that the eleventh reservation request comprises bandwidth and associated priority levels similar to the ten communication sessions currently in progress.

The eleventh reservation request may be considered a bandwidth event in that it impacts the bandwidth demands of node 241a. As discussed above, in the current example, processor 245 may have determined that there is not sufficient bandwidth available for all eleven communication sessions to use their highest bandwidth level. Accordingly, it may generally be desired that node 241a make adjustments resulting in the smallest impact in quality to the fewest number of communication sessions.

Accordingly, processor 245 may search memory 247 to determine the various bandwidth and priority levels associated with the ten ongoing communication sessions. Then processor 245 may apply one or more policies stored in memory 247 to identify one or more communication sessions that are to be downgraded. For example, processor 245 may decide that two of the ten established sessions will see their reservation reduced from thee Mbps to two Mbps and the new reservation for the eleventh communication session will be established at two Mbps. Thus, instead of simply rejecting the eleventh reservation request, node 241a would simply downgrade two existing communication sessions and accept the eleventh reservation request at two Mbps (as opposed to three Mbps). Thus, eight of the existing communication sessions would continue running at the high quality level, and two of the existing communication sessions would be downgraded to run at the medium quality level, thereby leaving two Mbps available for the eleventh communication session.

Once processor 245 makes the above determination, it may need to communicate the downgrade to the two existing communication sessions to both upstream and downstream components. Processor 245 may also communicate to the requesting endpoint via interface 249 that node 241a can not support the requested high quality level but that it can support the requested medium quality level. As discussed above, processor 245 may also modify the eleventh reservation request such that when it is relayed from node 241a to node 241b, the reservation request no longer includes the high quality level.

The dynamic, priority based, adjustments in bandwidth levels made by node 241a in response to a bandwidth event allows node 241a to service a greater number of communication sessions at a greater overall bandwidth. This is done while allowing those streams having a higher priority for a particular bandwidth to avoid having their bandwidth taken away compared to a stream having a lower priority associated with its current bandwidth. Thus, reservation preemption allows a chunk of bandwidth reserved for a given reservation to be reclaimed after the reservation establishment and reallocated to another reservation having a higher priority.

Thus far, several different embodiments and features have been presented. While only two endpoints 232 and three nodes 241 are depicted, communication network 200 may comprise any number of devices. Particular embodiments may combine one or more features depending on operational needs and/or component limitations. This may allow for great adaptability to the needs of various organizations and users. Some embodiments may include additional features. For example, in particular embodiments the reservation request may be sent to an off-path node, as opposed to an on-path node such as node 241a. As alluded to above, an off-path node may be a node responsible for reserving resources among several nodes of a communication network without itself actually being along the path used by the communication session. Furthermore, particular embodiments may be employed in any system that supports reservation requests or has a resource reservation system, whether on path or off-path.

Figure 4:
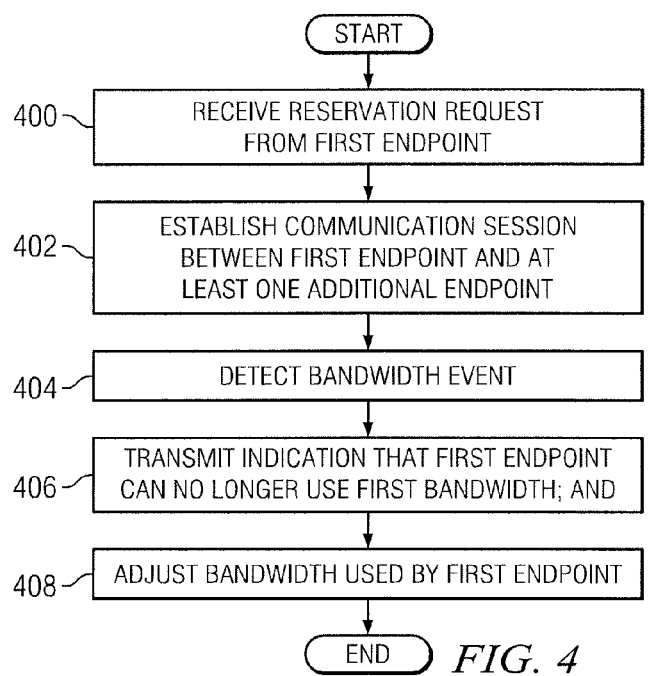
FIG. 4 illustrates a method for implementing priority based dynamic bandwidth adjustments, in accordance with particular embodiments.

FIG. 4 illustrates a method for implementing priority based dynamic bandwidth adjustments, in accordance with particular embodiments. In the embodiment depicted in FIG. 4 it may be assumed that the following steps are being performed by a node, such as node 241a described above with respect to FIG. 3. The method begins at step 400 with the receipt of a reservation request from a first endpoint. The reservation request may, in essence, identify and prioritize a plurality of bandwidth levels that the first endpoint has determined would be acceptable for use in a particular communication session with a second endpoint. In particular embodiments, the reservation request may comprise a bandwidth list identifying a plurality of bandwidth levels associated with the first endpoint.

The various bandwidth levels may be based on a combination of one or more factors, including, but not limited to, the resolution of the video to be used during the communication session, a quality level associated with a respective resolution, and/or a codec or algorithm used to encode the video. A change in any of these categories can change the amount of bandwidth needed for the session. For example, two communication sessions using the same codec at the same resolution may have different bandwidth requirements if they are using different quality levels. Accordingly, each change in the bandwidth requirement results in a different bandwidth level.

Depending on the embodiment, two or more of the bandwidth levels may have unique priority levels associated therewith. In certain scenarios, the relative priority levels associated with the bandwidth levels may increase as the respective bandwidth decreases. Thus, the bandwidth level having the lowest relative bandwidth has the highest relative priority associated therewith (conversely, in many instances, the lowest relative priority level is associated with the highest relative bandwidth). Thus, as the amount of bandwidth actually reserved for the communication session decreases levels, the first endpoint's priority to that bandwidth increases (thereby decreasing the likelihood of further decreasing the bandwidth).

The reservation request may be received directly or indirectly from the first endpoint. That is, the first endpoint may generate the reservation request, including the bandwidth list identifying the plurality of bandwidth levels and their associated priority level. Then, the first endpoint may transmit the reservation request to the first node (direct) in the path from the first endpoint to the second endpoint. After processing the request, the first node may then forward the request on to the next node (indirect) in the path towards the second endpoint.

At step 402 a communication session is established between the first endpoint and the second endpoint. In some embodiments, the communication session may also be established with other endpoints in addition to the first and second endpoints. The communication session may be established based on a first bandwidth level having a first bandwidth and a first priority level. The first bandwidth level may be one of a plurality of bandwidth levels contained in the reservation request from the first endpoint. The first bandwidth level may be the bandwidth level comprising the highest bandwidth available along the path between the first and second endpoints, taking into account the priority of the first bandwidth level.

At step 404 a bandwidth event is detected that impacts the bandwidth used by the first endpoint for the communication session. The bandwidth event may comprise any of a variety of events at, or between, any of the nodes along the path between the first and second endpoints that may impact the bandwidth available for the first communication session. This may include either an increase or a decrease in the available bandwidth. One example bandwidth event may comprise one of the nodes along the path receiving a reservation request from a third endpoint. Like the reservation request from the first endpoint, this reservation request from the third endpoint may comprise a bandwidth list identifying a plurality bandwidth levels each having a bandwidth and priority level associated therewith. If at least one priority level of this reservation request is higher than the first priority level associated with the first bandwidth used by the first and second endpoints then the first communication session may be downgraded in order to provide the requested bandwidth to the higher priority bandwidth level.

At step 406 an indication that the first endpoint can no longer use the first bandwidth is transmitted. This may alert the two endpoints and the nodes along the path between the two endpoints that the reservation is going to be downgraded. Because the reservation request received from the first endpoint comprised multiple bandwidth levels, the node may switch to a different bandwidth level requiring less bandwidth and having a higher priority, rather than simply terminating the communication session.

At step 408 the bandwidth used by the first endpoint is adjusted to a second bandwidth. The second bandwidth is associated with a second bandwidth level that is different than the first bandwidth level and has a different priority associated therewith. Depending on the bandwidth event, the second bandwidth may be greater than or less than the first bandwidth. The node may use a variety of techniques in adjusting the bandwidth for the first communication session. For example, in some embodiments the node may simply select another bandwidth level from among the plurality of bandwidth levels in the reservation request received at step 400. As another example, in particular embodiments the node may extrapolate between two different bandwidth levels of the plurality of bandwidth levels received at step 400.

Some of the steps illustrated in FIG. 4 may be combined, modified or deleted where appropriate, and additional steps may also be added to the flowchart. Additionally, steps may be performed in any suitable order without departing from the scope of particular embodiments.

Technical advantages of particular embodiments may include allowing for priority based dynamic bandwidth adjustments to be made based on current network conditions. This may allow various nodes used by the communication session to avoid simply rejecting additional requests when the node is currently using a relatively high amount of bandwidth for a relatively low priority communication session. This, in turn, may increase the communication network's utility function. Another technical advantage of particular embodiments may include maximizing the bandwidth achieved across all endpoints. This may prevent a particular communication session from seeing its bandwidth unnecessarily revoked. It may also allow the dynamic bandwidth adjustments to reflect any arbitrary priority policy. For example, the priority of the medium and high bandwidth levels of a particular session may be the same as a low bandwidth level of another less critical session.

Other technical advantages will be readily apparent to one of ordinary skill in the art from the figures, descriptions, and claims provided herein. Moreover, while specific advantages have been enumerated above, various embodiments may include all, some, or none of the enumerated advantages.

Although particular embodiments have been described in detail, it should be understood that various other changes, substitutions, combinations and alterations may be made hereto without departing from the spirit and scope of the disclosure. For example, although an embodiment has been described with reference to a number of elements included within network 30 such as nodes and endpoints, these elements may be combined, rearranged or positioned in order to accommodate particular routing or conferencing needs. In addition, any of these elements may be provided as integrated internal or separate external components to each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed:

1. A method comprising:
receiving a reservation request from a first endpoint, the reservation request comprising a bandwidth list identifying a plurality of bandwidth levels associated with the first endpoint, at least two of the bandwidth levels having a unique priority level associated therewith;
establishing a communication session between the first endpoint and at least one additional endpoint using a first bandwidth based on a first priority level, the first bandwidth and the first priority level each associated with a first bandwidth level of the plurality of bandwidth levels;
detecting a bandwidth event that impacts a bandwidth available for use by the first endpoint for the communication session; and
adjusting the bandwidth used by the first endpoint to a second bandwidth different than the first bandwidth based on a second priority level different than the first priority level, the second bandwidth and the second priority level each associated with a second bandwidth level of the plurality of bandwidth levels.

2. The method of claim 1, wherein detecting the bandwidth event comprises receiving a reservation request from a second endpoint, the reservation request comprising a bandwidth list identifying a plurality bandwidth levels associated with the second endpoint wherein each bandwidth level has a bandwidth and a priority level associated therewith, wherein at least one priority level is higher than the first priority level associated with the first bandwidth used by the first endpoint.

3. The method of claim 1, wherein:
if the second bandwidth is less than the first bandwidth then the second priority level is greater than the first priority level; and
if the second bandwidth is greater than the first bandwidth then the second priority level is less than the first priority level.

4. The method of claim 1, wherein the plurality of bandwidth levels associated with the first endpoint are based on one or more resolutions supported by the first endpoint.

5. The method of claim 4, wherein the plurality of bandwidth levels associated with the first endpoint are further based on a quality level associated with each resolution, wherein at least one resolution supported by the first endpoint comprises a plurality of different quality levels associated therewith.

6. The method of claim 1, further comprising determining the second priority associated with the first endpoint by extrapolating between the at least two priority levels associated with at least two of the bandwidths.

7. A method comprising:
generating at a first endpoint a reservation request comprising a bandwidth list identifying a plurality bandwidth levels associated with the first endpoint, each bandwidth level having a bandwidth and a priority level associated therewith;
transmitting the reservation request to a first node;
establishing a communication session with at least one other endpoint using a first bandwidth based on a first priority level associated with the first bandwidth level of the plurality of bandwidth levels;
receiving an indication that the first endpoint can no longer use the first bandwidth; and
adjusting the bandwidth used by the first endpoint to a second bandwidth different than the first bandwidth based on a second priority level different than the first priority level, the second bandwidth and the second priority level each associated with a second bandwidth level of the plurality of bandwidth levels.

8. The method of claim 7, wherein:
if the second bandwidth is less than the first bandwidth then the second priority level is greater than the first priority level; and
if the second bandwidth is greater than the first bandwidth then the second priority level is less than the first priority level.

9. The method of claim 7, wherein the plurality of bandwidth levels associated with the first endpoint are based on one or more resolutions supported by the first endpoint.

10. The method of claim 9, wherein the plurality of bandwidth levels associated with the first endpoint are further based on a quality level associated with each resolution, wherein at least one resolution supported by the first endpoint comprises a plurality of different quality levels associated therewith.

11. A device comprising:
an interface configured to:
receive a reservation request from a first endpoint, the reservation request comprising a bandwidth list identifying a plurality of bandwidth levels associated with the first endpoint, at least two of the bandwidth levels having a unique priority level associated therewith; and
establish a communication session between the first endpoint and at least one additional endpoint using a first bandwidth based on a first priority level, the first bandwidth and the first priority level each associated with a first bandwidth level of the plurality of bandwidth levels; and
a processor coupled to the interface and configured to:
detect a bandwidth event that impacts a bandwidth available for use by the first endpoint for the communication session; and
adjust the bandwidth used by the first endpoint to a second bandwidth different than the first bandwidth based on a second priority level different than the first priority level, the second bandwidth and the second priority level each associated with a second bandwidth level of the plurality of bandwidth levels.

12. The device of claim 11, wherein the bandwidth event comprises the receipt of a reservation request from a second endpoint, the reservation request comprising a bandwidth list identifying a plurality bandwidth levels associated with the second endpoint wherein each bandwidth level has a bandwidth and a priority level associated therewith, wherein at least one priority level is higher than the first priority level associated with the first bandwidth used by the first endpoint.

13. The device of claim 11, wherein:
if the second bandwidth is less than the first bandwidth then the second priority level is greater than the first priority level; and
if the second bandwidth is greater than the first bandwidth then the second priority level is less than the first priority level.

14. The device of claim 11, wherein the plurality of bandwidth levels associated with the first endpoint are based on one or more resolutions supported by the first endpoint.

15. The device of claim 14, wherein the plurality of bandwidth levels associated with the first endpoint are further based on a quality level associated with each resolution, wherein at least one resolution supported by the first endpoint comprises a plurality of different quality levels associated therewith.

16. The device of claim 11, wherein the processor is further configured to determine the second priority associated with the first endpoint by extrapolating between the at least two priority levels associated with at least two of the bandwidths.

17. A device comprising:
a processor configured to generate at a first endpoint a reservation request comprising a bandwidth list identifying a plurality bandwidth levels associated with the first endpoint, each bandwidth level having a bandwidth and a priority level associated therewith; and
an interface coupled to the processor and configured to:
transmit the reservation request to a first node;
establish a communication session with at least one other endpoint using a first bandwidth based on a first priority level associated with the first bandwidth level of the plurality of bandwidth levels; and
receive an indication that the first endpoint can no longer use the first bandwidth; and
wherein the processor is further configured to adjust the bandwidth used by the first endpoint to a second bandwidth different than the first bandwidth based on a second priority level different than the first priority level, the second bandwidth and the second priority level each associated with a second bandwidth level of the plurality of bandwidth levels.

18. The device of claim 17, wherein:
if the second bandwidth is less than the first bandwidth then the second priority level is greater than the first priority level; and
if the second bandwidth is greater than the first bandwidth then the second priority level is less than the first priority level.

19. The device of claim 17, wherein the plurality of bandwidth levels associated with the first endpoint are based on one or more resolutions supported by the first endpoint.

20. The device of claim 19, wherein the plurality of bandwidth levels associated with the first endpoint are further based on a quality level associated with each resolution, wherein at least one resolution supported by the first endpoint comprises a plurality of different quality levels associated therewith.

* * * * *